April 21, 1964 D. G. PETERSON 3,129,700
ENGINE ACCESSORY CASE
Filed Jan. 19, 1959 2 Sheets-Sheet 1

INVENTOR.
David G. Peterson
BY
ATTORNEY C. McKnight

INVENTOR.
David G. Peterson

United States Patent Office 3,129,700
Patented Apr. 21, 1964

3,129,700
ENGINE ACCESSORY CASE
David G. Peterson, P.O. Box 2355, Oakland, Calif.
Filed Jan. 19, 1959, Ser. No. 787,476
3 Claims. (Cl. 123—56)

This invention relates to improvements in aircraft structure, and more particularly, but not by way of limitation, to an engine accessory case so designed and constructed to provide for an engine nacelle of a minimum depth or thickness in order to simultaneously reduce the drag on the aircraft and increase the power ratio of the engine thereto.

The development of the opposed engine having horizontally disposed cylinders came at a time in the history of aircraft when there was a need for the adaptation thereof for single engine airplanes. The engine of a single engine aircraft is normally mounted ahead of a bulky fuselage, and as a result, there is no need for maintaining the overall depth of the engine and the nacelle at a minimum. Thus, the oil pan, carburetor and carburetor air scoop are frequently disposed below the engine, whereas the generator, starter and other essential accessories for the engine are usually disposed above the engine. This necessitates a bulky, thick nacelle construction substantially in conformity with the bulky structure of the airplane fuselage. However, with the increasing demand for multi-engine aircraft, it became evident that the use therewith of opposed engines with the bulky nacelle structure had many disadvantages. The engine of the multi-engine airplane is usually mounted on the leading edge of the wing, and the bulky nacelle structure of the opposed engines created a considerably greater drag on the aircraft. As a result, it became apparent that the engine nacelle structure must be adapted to the wing area in some manner in order to maintain substantially the same drag on the aircraft.

The present invention relates to an engine accessory case so designed and constructed to utilize an area behind the engine, and particularly an area behind the horizontally disposed engine cylinders which is normally wasted space. The engine accessory group, such as the magnetos, fuel injector in lieu of a carburetor, and propeller governor are disposed behind the engine outside of the normal engine mount. This adaptation makes it possible to completely bury the engine inside of a wing in certain types of aircraft. The engine nacelle structure need only be of a sufficiently large depth to encase the engine itself, thereby making it possible to design the nacelle substantially the same depth as the leading edge of the wing structure. Thus, the airfoil shape of the wing may be maintained at the point of mounting of the engine thereon. This results in reducing the drag on the aircraft, and increases the power ratio of the engine thereto.

It is an important object of this invention to provide an improved multi-engine aircraft structure wherein the drag of the aircraft is decreased with a simultaneous increase of the power ratio of the engine thereto.

It is another object of this invention to provide an engine accessory case for an airplane engine whereby the overall depth of the engine structure is maintained at a minimum.

Another object of this invention is to provide an engine accessory case for an engine whereby the engine accessories are mounted in an area which is normally wasted space.

Still another object of this invention is to provide an engine accessory case so designed and constructed as to permit the engine nacelle structure around the engine to be maintained at a minimum depth in accordance with the wing structure of an airplane for increasing the efficiency of the operation thereof.

A further object of this invention is to provide an engine accessory case so designed and constructed to permit the engine to be buried within the wing of many types of aircraft.

A still further object of this invention is to provide a novel engine accessory case for aircraft which is simple and efficient in operation and economical and durable in construction.

Other objects and advantages of the invention will be evident from the following detailed description, read in conjunction with the accompanying drawings, which illustrate my invention.

Figure 1:
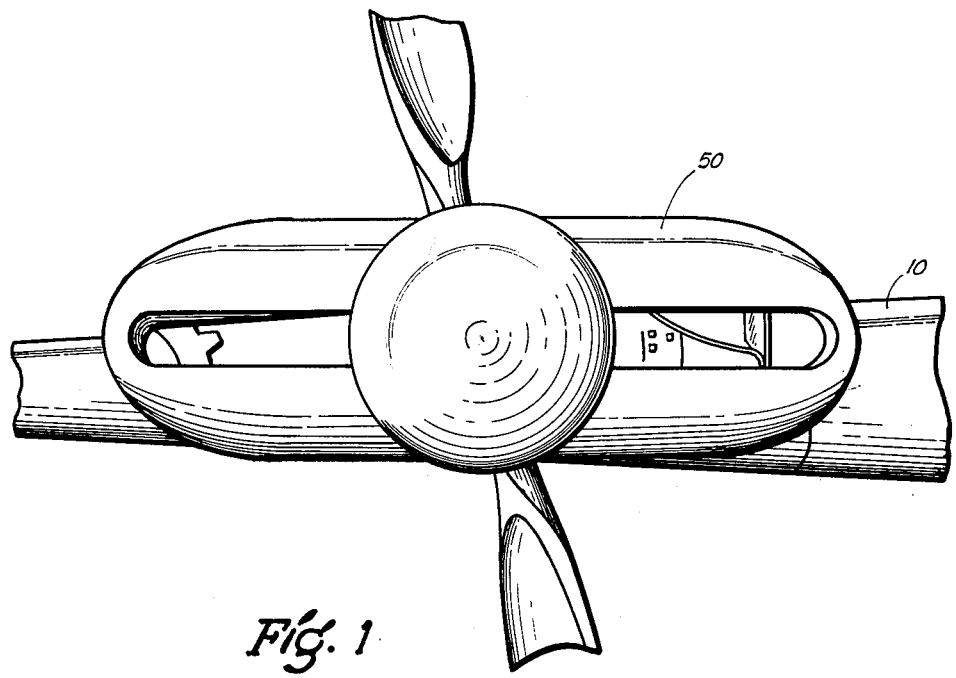
FIGURE 1 is a front view of a portion of an airplane wing having an engine mounted thereon and depicting the thin overall depth of the engine nacelle.

Referring to the drawings in detail, reference character 10 indicates an airplane wing having a suitable engine mounting structure, generally indicated at 12, secured therein. The engine mount 12 depicted herein is preferably the structure disclosed in my co-pending application entitled "Engine Mount" Serial No. 787,658, filed in the United States Patent Office on January 19, 1959, now Patent 3,003,718, issued October 10, 1961. However, it is to be understood that any suitable type of engine mounting structure may be utilized. The mounting structure 12 preferably comprises a substantially Y-shaped re-enforcing structure 14 secured within the wing 10 and having a plurality of spaced tubular bar members 16 or the like extending longitudinally forward therefrom. Suitable diagonally disposed bracing members 18 may be provided between adjacent pairs of the bars 16, if desired, for strengthening thereof. An engine 20 having horizontally disposed cylinders, such as shown at 22 and 24, is carried by the mounting bars 16 in any well known manner (not shown) for supporting the engine 20 in the proximity of the wing 10. While only two cylinders are shown, the number thereof is not limited thereto.

An engine accessory case or housing 26 is suitably secured to the rear of the engine 20 in the proximity of the bars 16 for housing a gear train, generally indicated at 27 (FIG. 4), as will be hereinafter set forth. An accessory case extension housing member 28 extends to the left of the case 26, as viewed in the drawings, and is disposed rearwardly of the left hand engine cylinder 22 in order to house a portion of the gear train 27. A similar accessory case extension housing member 30 extends to the right of the case 26 and is disposed rearwardly of the right hand cylinder 24 for housing the remaining portion of the gear train 27. It will be apparent that the entire accessory case comprises the central portion 26 in combination with the left and right hand extension portions 28 and 30, respectively, for mounting the engine accessory group rearwardly of the engine 20 and the opposed cylinders 22 and 24, as will be hereinafter set forth, thus permitting the utilization of an area of normally wasted space 31 behind the engine and cylinders. The extension portions are preferably integral with the central portion 26, but not limited thereto.

Figure 2:
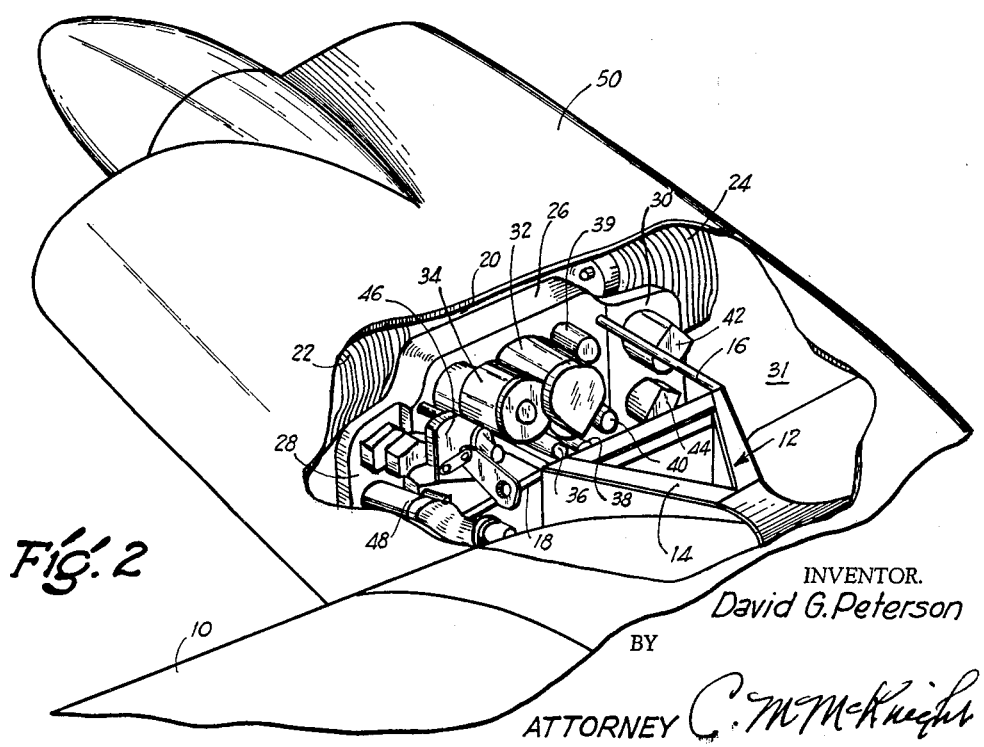
FIGURE 2 is a perspective view of an engine mounted on an airplane wing, and broken away to depict the engine accessory case.
Figure 3:
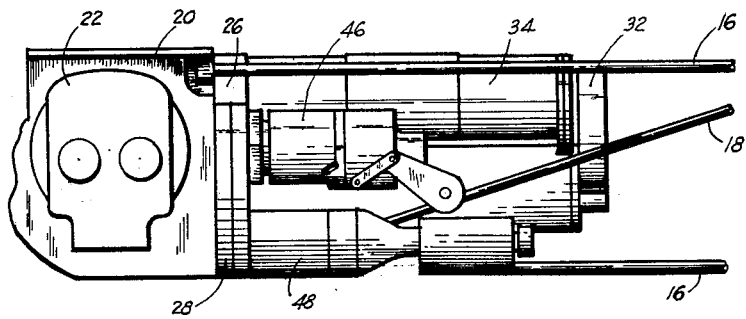
FIGURE 3 is a side elevational view of an engine accessory case embodying the invention.

The engine accessory group is mounted on the accessory case 26—28—30 in any well known manner (not shown), and extends rearwardly therefrom as clearly shown in FIGS. 2 and 3. The engine accessory group preferably comprises an engine starter 32, a generator 34, oil pump 36, a tachometer generator 38, a fuel pump 39, and a vacuum pump 40 mounted on the central portion 36 of the accessory case in any well known manner (not shown) and disposed between the tubular bar members 16. A pair of magnetos 42 and 44 are similarly mounted on the right hand extension member 30 and extend rearward therefrom behind the right hand engine cylinder 24. A propeller governor 46 and a fuel injector unit 48 are mounted on the left hand extension member 28 and extend rearwardly therefrom behind the left hand engine cylinder 22. It will be apparent that any required engine accessories may be mounted on the accessory case, and the particular arrangement thereof shown herein may be varied as desired to provide substantially any engine accessory arrangement disposed behind the engine 20 and the cylinders 22 and 24. Thus, the normally wasted space 31 behind the engine 20 and the cylinders 22 and 24 is utilized in order to maintain the overall depth or height of the engine at a minimum. It will be apparent from the foregoing that the engine nacelle 50 may be constructed with a minimum depth in order to substantially conform to the airfoil shape of the wing 10, thereby reducing the drag on the aircraft (not shown), and simultaneously increasing the power ratio of the engine 20 thereto.

Figure 4:
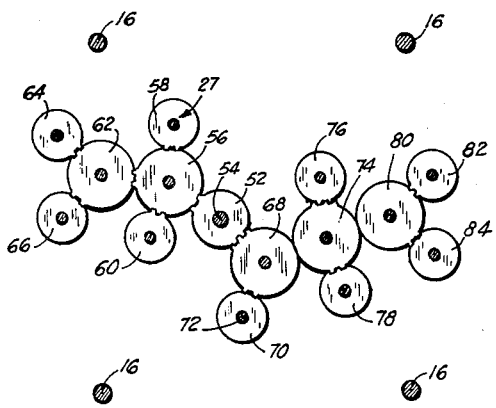
FIGURE 4 is a schematic view of the gear train for the engine accessories.

Referring to FIG. 4, the gear train 27 housed within the accessory case 26—28—30 comprises a main drive gear 52 suitably secured to the main drive shaft 54 of the engine 20. Thus, the gear 52 rotates continuously with the rotation of the drive shaft 54. An idler gear 56 is suitably journalled in the accessory case 26—28—30 slightly upwardly and to the left of the main gear 52, as viewed in the drawings, for transmitting rotation from the gear 52 to the generator gear 58 for supplying the power for operation of the generator 34 as is well known. The idler gear 56 simultaneously transmits rotation to an oil pump gear 60 for operation of the oil pump 36. A second idler gear 62 is journalled in the accessory case and is disposed to the left of the first idler gear 56 for transmitting rotation to a propeller governor gear 64 in order to supply power to the propeller governor 46. The second idler gear 62 simultaneously transmits rotation to a fuel injector gear 66, which in turn provides for actuation of the fuel injector 48, as is well known. A third idler gear 68 is journalled in the accessory case 26—28—30 and is disposed slightly downwardly and to the right of the main gear 52 for transmitting rotation to a gear 70 which is suitably secured to the cam shaft 72 of the valve mechanism (not shown) of the engine 20. The gear 70 also functions to drive the oil pump 36, which is mounted on the accessory case, as hereinbefore set forth. The idler gear 68 meshes with yet another idler gear 74 which in turn rotates a fuel pump gear 76 for actuation of the fuel pump 39. The idler gear 74 simultaneously rotates a vacuum pump gear 78 for supplying power to the vacuum pump 40. A fifth idler gear 80 is rotated by the idler gear 74 and meshes with a pair of magneto gears 82 and 84 for actuation of the magnetos 42 and 44, respectively. It will be apparent that any suitable gearing arrangement for the engine accessories may be utilized, or any other suitable type of drive system, such as a chain drive, or the like, may be utilized.

Figure 5:
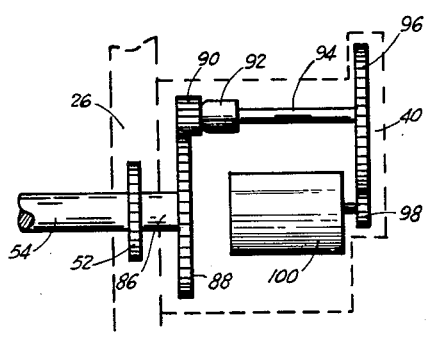
FIGURE 5 is a side elevational view of the gearing arrangement for the engine starter with portion shown in phantom for purpose of illustration.

The main drive shaft 54 extends through the main drive gear 52 as shown at 86 (FIG. 5) to receive a starter gear 88 of the starter mechanism 40. The starter gear 88 meshes with a pinion drive gear 90 normally provided with a starter drive mechanism 92, such as is known in the industry as a Bendix drive. A shaft 94 extends longitudinally from the drive mechanism 92 and is provided with a reduction gear member 96 secured to the outer extremity thereof. It is preferable that the drive mechanism 92 be of a slip clutch drive type, but not limited thereto, in order to preclude any damage to the gearing in the event that the engine 20 back fires. The gear 96 in turn meshes with a starter motor drive pinion gear 98 which is normally provided on a suitable starter motor 100, as is well known. It will be apparent that upon starting of the motor 100 in the normal manner (not shown), the gear 98, meshing with the reduction gear 96, turns the shaft 94 and drives the starter drive mechanism 92, which in turn rotates the pinion gear 90 for rotating the starter gear 88. The rotation of the gear 88 is transmitted to the main drive gear 52 through the shaft extension 86, thereby rotating the main drive shaft 54 of the engine 20 for providing power thereto. Simultaneously, the main drive gear 52 provides power for the operation of the gear train 27, as hereinbefore set forth.

By way of summary, the engine accessory case 26—28—30 secured to the rear portion of the engine 20 permits the mounting of the engine accessories rearwardly of the engine, and behind the horizontally disposed cylinders 22 and 24 in the area 31 which is normally wasted space. This disposition of the engine accessories maintains the overall depth or height of the engine 20 at a minimum whereby the nacelle structure 50 may be constructed of a minimum depth, as particularly shown in FIG. 1. Thus, the nacelle 50 may be constructed of an airfoil shape corresponding to the shape of the wing 10 in order to reduce the drag and increase the lift on the aircraft (not shown). Thus, the power ratio of the engine to the aircraft is increased simultaneously with a reduction of the drag on the aircraft.

From the foregoing, it will be apparent that the present invention provides an engine accessory case whereby the engine accessories may be mounted behind or rearwardly of the engine to utilize space which is normally wasted. This rearward disposition of the engine accessories permits the overall depth of the engine nacelle structure to be maintained at a minimum depth for increasing the efficiency of a multi-engine aircraft. The engine accessory case is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In combination with an engine having horizontally disposed opposed cylinders and mounted in the wing of an aircraft, an engine accessory case comprising a housing secured to the rear portion of the engine, a plurality of engine accessories carried by the housing and extending rearwardly therefrom, said engine accessories contained within the confines of a cross-sectional area determined by the outer periphery of the crank case and the opposed pistons of the engine, and means disposed within the housing for transmitting power from the engine to the engine accessories.

2. In combination with an engine having horizontally disposed opposed cylinders and mounted in the wing of an aircraft, an engine accessory case comprising a housing secured to the rear portion of the engine, a pair of oppositely disposed extension members for the housing disposed rearwardly of the cylinders, a plurality of engine accessories carried by the housing and the housing extension members and extending rearwardly from the engine and the cylinders, said engine accessories confined to a cross-sectional area at least as small as the cross-sectional area of the crank case and the opposed pistons of the engine, and a gear train disposed within the housing for transmitting power from the engine to the accessories.

3. In combination with an engine having horizontally disposed opposed cylinders and mounted in the wing of an aircraft, an engine accessory case comprising a housing secured to the rear portion of the engine, a plurality of engine accessories carried by the housing and extending rearwardly therefrom and confined within the limits bounded by the outer periphery of the crank case and the opposed pistons of the engine, said engine accessories including an engine starter, a generator, an oil pump, a tachometer generator, a fuel pump, and a vacuum pump, and a gear train disposed within the housing for transmitting power from the engine to the engine accessories for operation thereof.

References Cited in the file of this patent

UNITED STATES PATENTS

| | | |
|---|---|---|
| 1,680,017 | Fornaea | Aug. 7, 1928 |
| 1,906,045 | Chevrolet | Apr. 25, 1933 |
| 1,975,600 | Gosslau | Oct. 2, 1934 |
| 2,076,224 | Chilton | Apr. 6, 1937 |
| 2,111,828 | Weaver et al. | Mar. 22, 1938 |
| 2,172,100 | Koffman | Sept. 5, 1939 |
| 2,488,174 | Clegern | Nov. 15, 1949 |
| 2,678,037 | Wiegman | May 11, 1954 |

FOREIGN PATENTS

| | | |
|---|---|---|
| 700,352 | France | Dec. 23, 1930 |

OTHER REFERENCES

"High Speed Diesel Engines for Automotive, Aeronautical . . . Use," by P. M. Heldt, Sixth edition, 1950, published by P. M. Heldt, Nyack, N.Y., pages 24, 25.